(12) United States Patent
O'Charoen et al.

(10) Patent No.: US 9,111,245 B2
(45) Date of Patent: Aug. 18, 2015

(54) DISPLAYING MODELING DATA AND LOGICAL DATA

(71) Applicants: Veekit O'Charoen, Mukilteo, WA (US); Brian J. Purves, Everett, WA (US); Michael Patrick Sciarra, Seattle, WA (US); Patrick Eames, Newcastle, WA (US)

(72) Inventors: Veekit O'Charoen, Mukilteo, WA (US); Brian J. Purves, Everett, WA (US); Michael Patrick Sciarra, Seattle, WA (US); Patrick Eames, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 229 days.

(21) Appl. No.: 13/624,467

(22) Filed: Sep. 21, 2012

(65) Prior Publication Data

US 2014/0088924 A1 Mar. 27, 2014

(51) Int. Cl.
- G06F 17/50 (2006.01)
- G06Q 10/06 (2012.01)
- G06Q 10/10 (2012.01)
- G06Q 50/04 (2012.01)

(52) U.S. Cl.
CPC ............ *G06Q 10/063* (2013.01); *G06Q 10/103* (2013.01); *G06Q 50/04* (2013.01)

(58) Field of Classification Search
CPC .... G06Q 10/063; G06Q 10/103; G06Q 10/04
See application file for complete search history.

(56) References Cited

U.S. PATENT DOCUMENTS

| | | | |
|---|---|---|---|
| 5,878,408 A | 3/1999 | Van Huben et al. | |
| 5,920,873 A | 7/1999 | Van Huben et al. | |
| 6,272,387 B1 * | 8/2001 | Yoon | 700/83 |
| 6,970,755 B2 | 11/2005 | Sakakura et al. | |
| 7,082,590 B2 | 7/2006 | Kragh et al. | |
| 7,725,746 B2 | 5/2010 | Lee et al. | |
| 7,793,250 B2 | 9/2010 | Saini et al. | |
| 2003/0023947 A1 | 1/2003 | Sakakura et al. | |
| 2004/0024662 A1 | 2/2004 | Gray et al. | |
| 2005/0183052 A1 | 8/2005 | Ash-Rafzadeh | |
| 2005/0240605 A1 * | 10/2005 | Knoblock et al. | 707/100 |
| 2006/0043976 A1 * | 3/2006 | Gervais | 324/508 |
| 2007/0233434 A1 * | 10/2007 | Lee | 703/1 |
| 2010/0031212 A1 * | 2/2010 | Dong et al. | 716/8 |
| 2010/0146466 A1 | 6/2010 | Hadley et al. | |
| 2011/0173042 A1 * | 7/2011 | Riepshoff et al. | 705/7.26 |

OTHER PUBLICATIONS

USPTO final office action dated Nov. 17, 2011 regarding U.S. Appl. No. 12/331,216, 11 pages.
USPTO office action dated May 11, 2011 regarding U.S. Appl. No. 12/331,216, 9 pages.
Amendment after final dated Jan. 17, 2012 regarding U.S. Appl. No. 12/331,216, 10 pages.
Response to office action dated Aug. 29, 2011 regarding U.S. Appl. No. 12/331,216, 12 pages.

(Continued)

*Primary Examiner* — Tarek Chbouki
(74) *Attorney, Agent, or Firm* — Yee & Associates, P.C.

(57) ABSTRACT

A method and apparatus for displaying information about a group of harnesses. Logical data of a database comprising a group of identifiers comprising a group of harness identifiers and a group of vehicle identifiers of a database is displayed. A selected identifier of the group of identifiers is received. Modeling data is displayed, wherein the modeling data comprises a harness set related to a model of a vehicle that is associated with a vehicle identifier and is related to the selected identifier.

21 Claims, 11 Drawing Sheets

(56) References Cited

OTHER PUBLICATIONS

EP Search Report, dated Jan. 20, 2014, regarding Application No. EP13184088, 11 pages.
Office Action, dated Nov. 30, 2012, regarding U.S. Appl. No. 12/331,216, 12 pages.
Final Office Action, dated Apr. 30, 2013, regarding U.S. Appl. No. 12/331,216, 13 pages.
Office Action, dated Nov. 1, 2013, regarding U.S. Appl. No. 12/331,216, 8 pages.
Final Office Action, dated Apr. 24, 2014, regarding U.S. Appl. No. 12/331,216, 8 pages.
Notice of Allowance, dated Sep. 29, 2014, regarding U.S. Appl. No. 12/331,216, 10 pages.

* cited by examiner

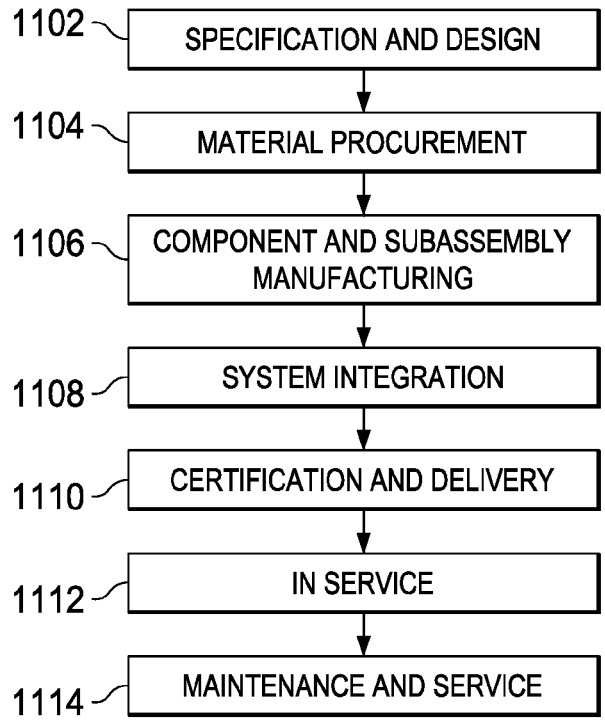
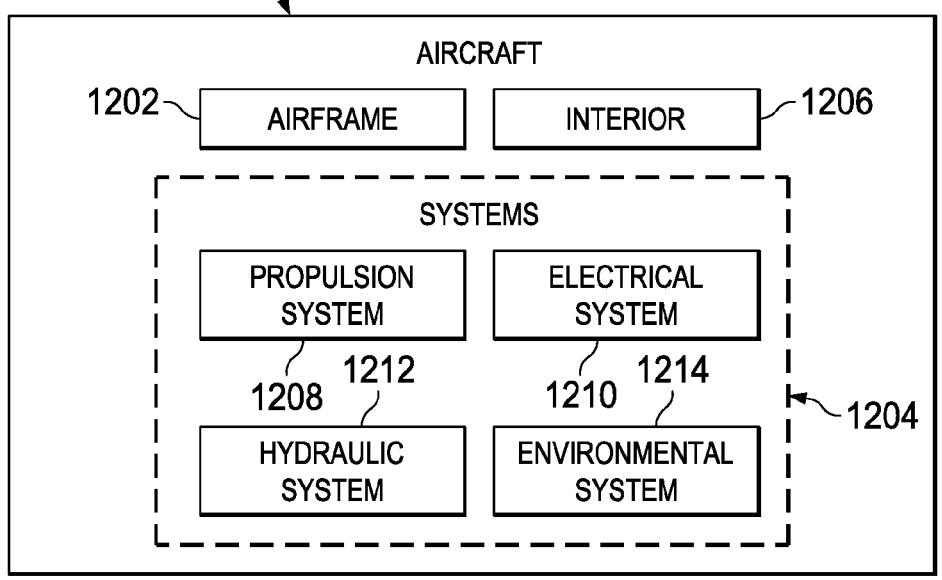

DISPLAYING MODELING DATA AND LOGICAL DATA

BACKGROUND INFORMATION

1. Field

The present disclosure relates to an electrical apparatus and its corresponding methods to perform data processing operations to organize and manage resources. Still more particularly, the present disclosure relates to methods and apparatus for displaying modeling data and logical data in order to organize and manage resources.

2. Background

Manufacturing a vehicle requires a large number of connectors, harnesses, and equipment that need to be installed into the vehicle. Additionally, the manufacturing of a single vehicle may occur at several sites and the vehicle itself may be subdivided into several zones. An example of a vehicle, without limitation, is an aircraft.

An installation plan may be created for use in installing the harnesses and other equipment. The installation plan may identify all of the connectors, harnesses, and equipment that require installation, the location of parts, and identify the work needed to be done to perform the installation of the parts. The installation plan uses logical data from a database to identify the connectors, harnesses, and equipment.

The information considered in creating an installation plan may include hundreds of thousands of parts that might be installed in an aircraft. An operator looks at the information in the logical data to create an installation plan for some of the parts that are to be installed. The logical data includes a list of the parts, part identifiers and other information in a textual format.

The operator also views drawings for the aircraft in creating the installation plan. The drawings help the operator decide what parts should be included in an installation plan and where the parts should be installed. For example, the drawings may show structures to which connections of parts should be made. The installation plans may also help the operator determine what paths parts such as harnesses should be placed on in creating the installation plan. These installation plans are in paper form or may be displayed on a display device.

Looking at the logical data and the installation plans may increase the complexity of creating an installation plan, may increase the time required to develop an installation plan, and may increase the time required to review the installation plan. A three dimensional model, comprising modeling data, that describes the vehicle may also be developed to design the vehicle and plan for its manufacture. The three dimensional model of the design for the vehicle includes everything that is to be installed into the vehicle, including all of the connectors, harnesses, and equipment. For developing the installation plan, the three dimensional model is reduced to two dimensional paper schematics that are referenced when developing the installation plan. To develop the installation plan one must look to the logical data on a computer while also manually paging through the schematics on paper. This increases the complexity of and the time required for developing a quality installation plan. Therefore, it would be desirable to have a method and apparatus that takes into account at least some of the issues discussed above, as well as other possible issues.

SUMMARY

In one embodiment, a method for displaying information about a group of harnesses is present. Logical data of a database comprising a group of identifiers comprising a group of harness identifiers and a group of vehicle identifiers is displayed. A selected identifier of the group of identifiers is received. Modeling data is displayed, the modeling data comprising a harness set related to a model of a vehicle that is associated with a vehicle identifier and is related to the selected identifier.

In another embodiment, an apparatus that displays modeling data is present. The apparatus comprises a display configured to display logical data of a database. The logical data comprises a group of identifiers comprising a group of harness identifiers and a group of vehicle identifiers. The apparatus further comprises a processor configured to receive a selected identifier from the group of identifiers. The display is further configured to display the modeling data, the modeling data comprising a harness set related to a model of a vehicle that is associated with a vehicle identifier and is related to the selected identifier.

In another embodiment, a method for displaying information about a harness in a vehicle is present. A group of harnesses in the vehicle is identified. Logical data about the group of harnesses in the vehicle is identified. A placement of the group of harnesses in a model of the vehicle is identified from the logical data. The group of harnesses in the vehicle in the placement identified is displayed on a display system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of an aircraft manufacturing and service method depicted in accordance with an illustrative embodiment; and FIG. 12 is an illustration of an aircraft depicted in accordance with an illustrative embodiment.

DETAILED DESCRIPTION

Figure 1:
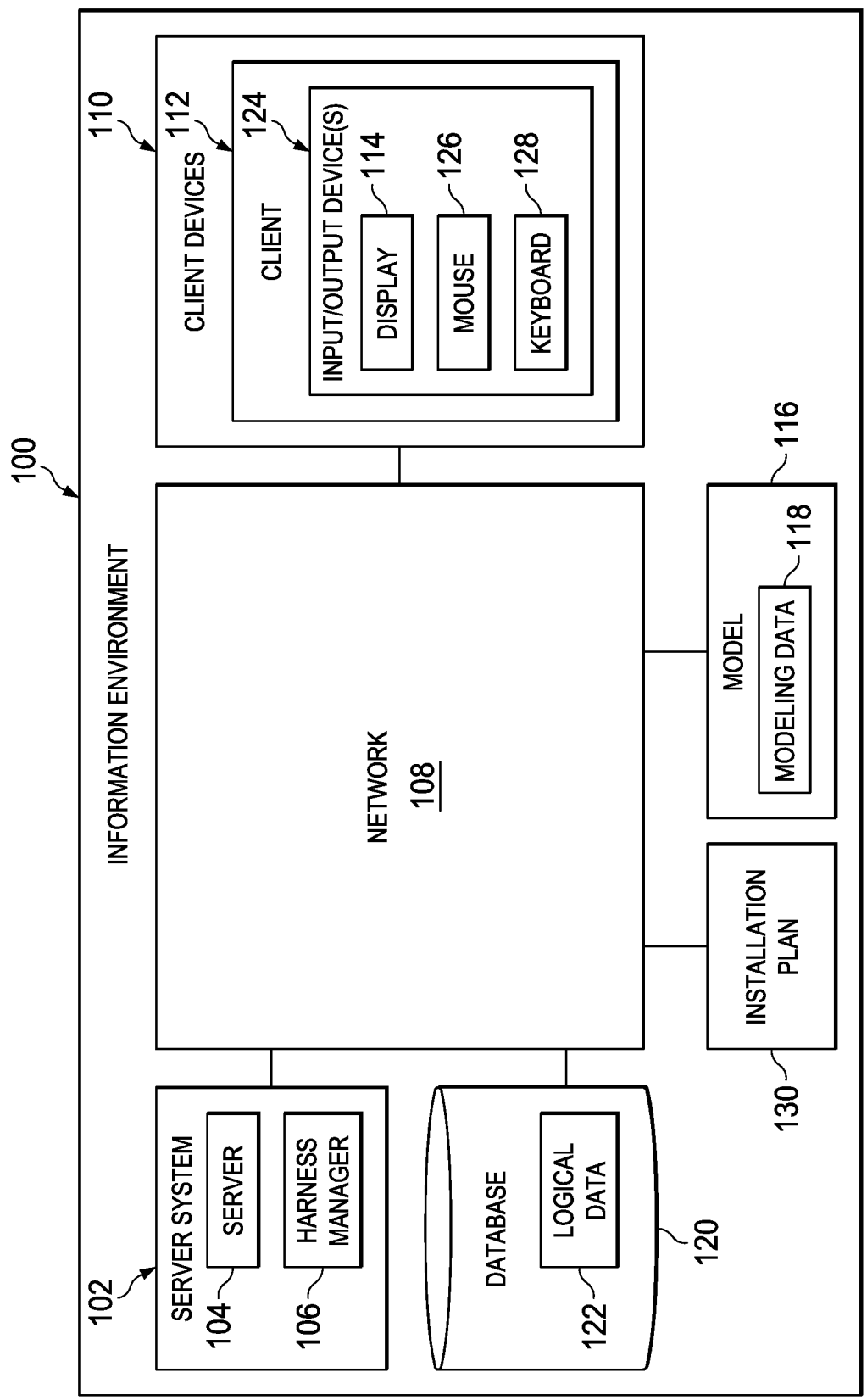
FIG. 1 is an illustration of an information environment in the form of a block diagram in accordance with an illustrative embodiment.

Turning now to FIG. 1, an illustration of an information environment in the form of a block diagram is depicted in accordance with an illustrative embodiment. In this illustrative example, information environment 100 includes server system 102, network 108, client devices 110, model 116, database 120, and installation plan 130.

Server system 102 includes server 104 and harness manager 106. Server system 102 provides client devices 110 with access to database 120 and model 116.

Server 104 comprises one more processors to handle the messages that are sent to and from client devices 110 and that are related to model 116 and database 120. Additionally, while a single server is shown, multiple servers each comprising multiple processors may be configured to handle the messages that are sent to and from the client devices 110.

Harness manager 106 includes software and/or hardware that runs on or is included by server 104. Harness manager 106 manages the messages to and from client devices 110 that relate to a harness of a vehicle.

Network 108 comprises computers and hardware interconnected by communication channels that allow sharing of resources and information between client devices 110, server system 102, and database 120. Network 108 can include one of more of an intranet, a local area network, a wide area network, and the Internet.

Client devices 110 include one or more clients 112. Client devices 110 send and receive messages to and from server system 102 allowing for multiple concurrent accesses by multiple individuals to model 116 and database 120 that provide for collaboration within information environment 100.

Client 112 of client devices 110 includes a group of input/output devices 124. As used here, a "group of" when used with reference to items means one or more items. For example the group of input/output devices 124 is one or more input/output devices.

Client 112 can be one of a workstation, a personal computer, a tablet computer, a smart phone, or the like. Client 112 sends and receives messages to and from server 104 to request logical data 122 from database 120 and modeling data 118 of model 116.

Logical data 122 comprises a group of identifiers and other data related to model 116. Logical data 122 may be displayed in a tabular view, such as tabular view 422 in FIG. 4. Logical data 122 is separate from modeling data 118 and describes non-geometric relationships. Logical data is data about sites, vehicles, equipment, harnesses, and connectors in a textual form. In other words, the logical data may not include visualizations of the parts but descriptions that may be identifiers, names, summaries, and the like. As an example, logical data 122 describes which sites are for which vehicles that comprise which zones, equipment, harnesses, and connectors.

Client 112 may receive different information based on the type of client device. As an example, if client 112 is a workstation, client 112 may receive an entire copy of database 120 with which to work. Alternatively, if client 112 is a smart phone, the client might receive a small subset of logical data 122 from database 120.

The group of input/output devices 124 may include display 114, mouse 126, keyboard 128, and any other device which may be used to input information to and/or output information from client 112.

Display 114 of client 112 displays logical data 122 and modeling data 118 that are received in response to messages requesting such data to be sent from client 112 to server 104. Display 114 displays a navigation interface that includes a tree window, a logical data window of logical data 122 from database 120, and a model window of modeling data 118 from model 116. Additional or alternative embodiments may have display 114 being a touched sensitive display or touch screen that provides input to as well as output from client 112.

Mouse 126 of client 112 is a pointing device that detects two dimensional motion to be used as input to client 112. Mouse 126 is communicatively coupled to client 112 with or without wires. Mouse 126 allows a user to give input to client 112.

Keyboard 128 of client 112 is a device for inputting text and numbers to client 112. Keyboard 128 is communicatively coupled to client 112 with or without wires. Keyboard 128 allows a user to give input to client 112.

Model 116 is a three dimensional model of a vehicle that includes modeling data 118. Some, or all, of model 116 can be displayed on display 114 of client 112.

Modeling data 118 describes the three dimensional model of the vehicle. Modeling data 118 can include any number of files and can be stored in any number of databases that can be accessed by any number of servers and clients.

Database 120 stores and provides access to logical data 122. Database 120 may be stored on server 104. Database 120 may also include modeling data 118 of model 116 and installation plan 130.

Installation plan 130 documents the installation of a harness to equipment with the use of a connector in a zone of a vehicle at a site and is used by assembly line workers to guide the installation. To manage installation plan 130, logical data 122 and modeling data 118 are used. Embodiments of the invention in accordance with the disclosure solve the problem of providing this data by providing logical data 122 and modeling data 118 to a manager of an installation plan via a single user interface at client 112 instead of the creator looking at logical data on a computer and looking at models on paper schematics, thereby easing the creation of installation plan 130. As used herein, the term "manage" means creating, modifying, organizing, and the like.

The illustration of information environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

As an example, database 120 may reside on client 112 with client 112 accessing model 116 via server 104. Alternatively, model 116 may reside on client 112 with client 112 accessing logical data 122 of database 120 via server 104.

Figure 2:
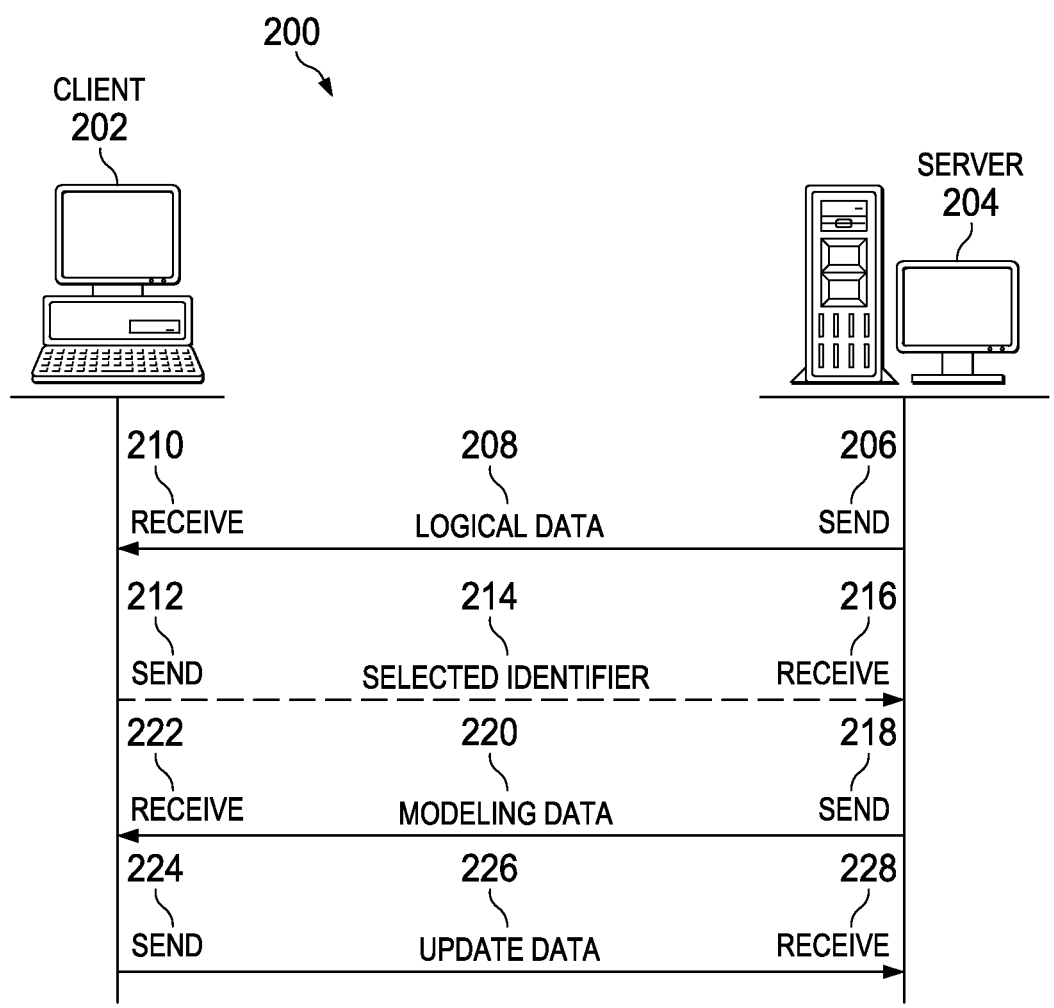
FIG. 2 is an illustration of client server data flow in the form of a data flow diagram in accordance with an illustrative embodiment.

Turning now to FIG. 2, an illustration of client server data flow in the form of a data flow diagram is depicted in accordance with an illustrative embodiment. In this illustrative example, client server data flow 200 describes the data and messages passed back and forth between a client such as client 202 and a server such as server 204. The sending and receiving operations depicted within FIG. 2 are via one or more messages passed over a network, such as network 108, between client 202 and server 204. Client 202 is an illustrative embodiment of client 112 of FIG. 1 and server 204 is an illustrative embodiment of server 104 of FIG. 1.

At 206, server 204 sends logical data 208 to client 202. At 210, client 202 receives logical data 208 from server 204. Logical data 208 is an illustrative embodiment of logical data 122 of database 120 and comprises a group of identifiers related to a group of harnesses. Logical data 208 is sent by server 204 and received by client 202 in order for client 202 to display logical data 208 to a user, e.g., via display 114 of input/output devices 124 in FIG. 1.

At 212, client 202 optionally sends selected identifier 214 to server 204. At 216, server 204 receives selected identifier 214 from client 202. Client 202 sends selected identifier 214 to server 204 after a user has selected identifier 214 using input devices connected to client 202. Client 202 may not have all of the logical data and modeling data that are related to selected identifier 214 and, in such cases, client 202 may send a message that is or includes a request for the logical data and modeling data that are related to selected identifier 214. Additionally, server 204 may track all of the selected identifiers it receives to identify portions of the logical data and/or modeling that have been accessed.

At 218, server 204 sends modeling data 220 to client 202. At 222, client 202 receives modeling data 220 from server 204. Modeling data 220 that is received may be a portion of the modeling data of a model that is related to selected identifier 214. Modeling data 220 is sent by server 204 and received by client 202 in order for client 202 to display modeling data 220 to a user, e.g., via display 114 of input/output devices 124 in FIG. 1.

At 224, client 202 sends update data 226 to server 204. At 228, server 204 receives update data 226 from client 202. Update data 226 was received by client 202 and may be from a user to provide an update or change to logical data 208. Update data 226 is sent to server 204 so that the server may update a database, such as database 120 in FIG. 1, that maintains logical data 208 with update data 226.

Figure 3:
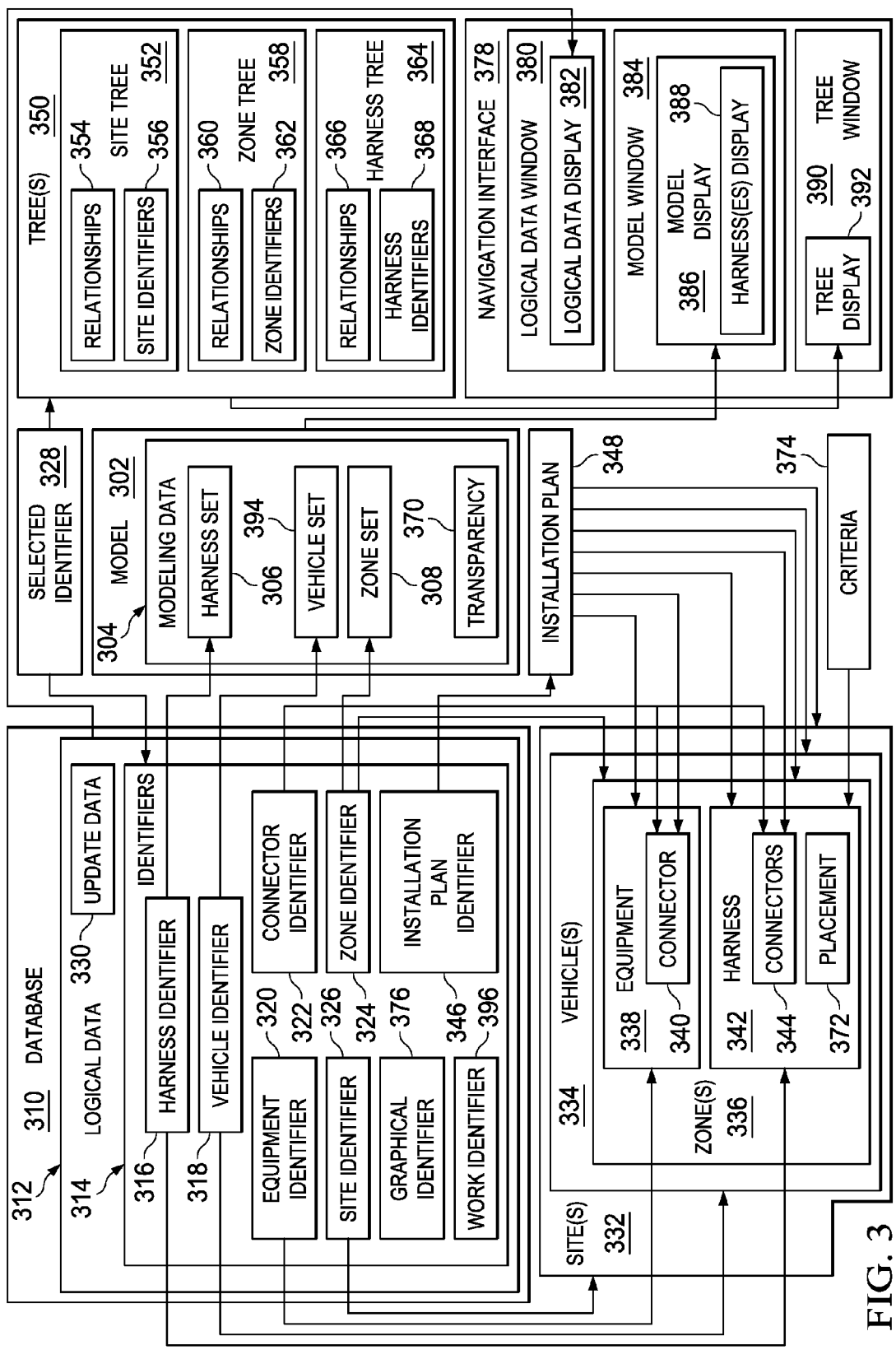
FIG. 3 is an illustration of a system for displaying modeling and logical data in the form of a block diagram in accordance with an illustrative embodiment.

Turning now to FIG. 3, an illustration of a system for displaying modeling and logical data in the form of a block diagram is depicted in accordance with an illustrative embodiment. In this illustrative example, relationships between the various parts of the system are described. Database 310 is an illustrative embodiment of database 120 in FIG. 1. Logical data 312 is an illustrative embodiment of logical data 122 and logical data 208 in FIG. 2. Update data 330 is an illustrative embodiment of update data 226.

Selected identifier 328 is an illustrative embodiment of selected identifier 214. Model 302 is an illustrative embodiment of model 116, model 512, and model 612 in FIGS. 1, 5, and 6, respectively. Modeling data 304 is an illustrative embodiment of modeling data 118 and modeling data 220. Installation plan 348 is an illustrative embodiment of installation plan 130.

Figure 4:
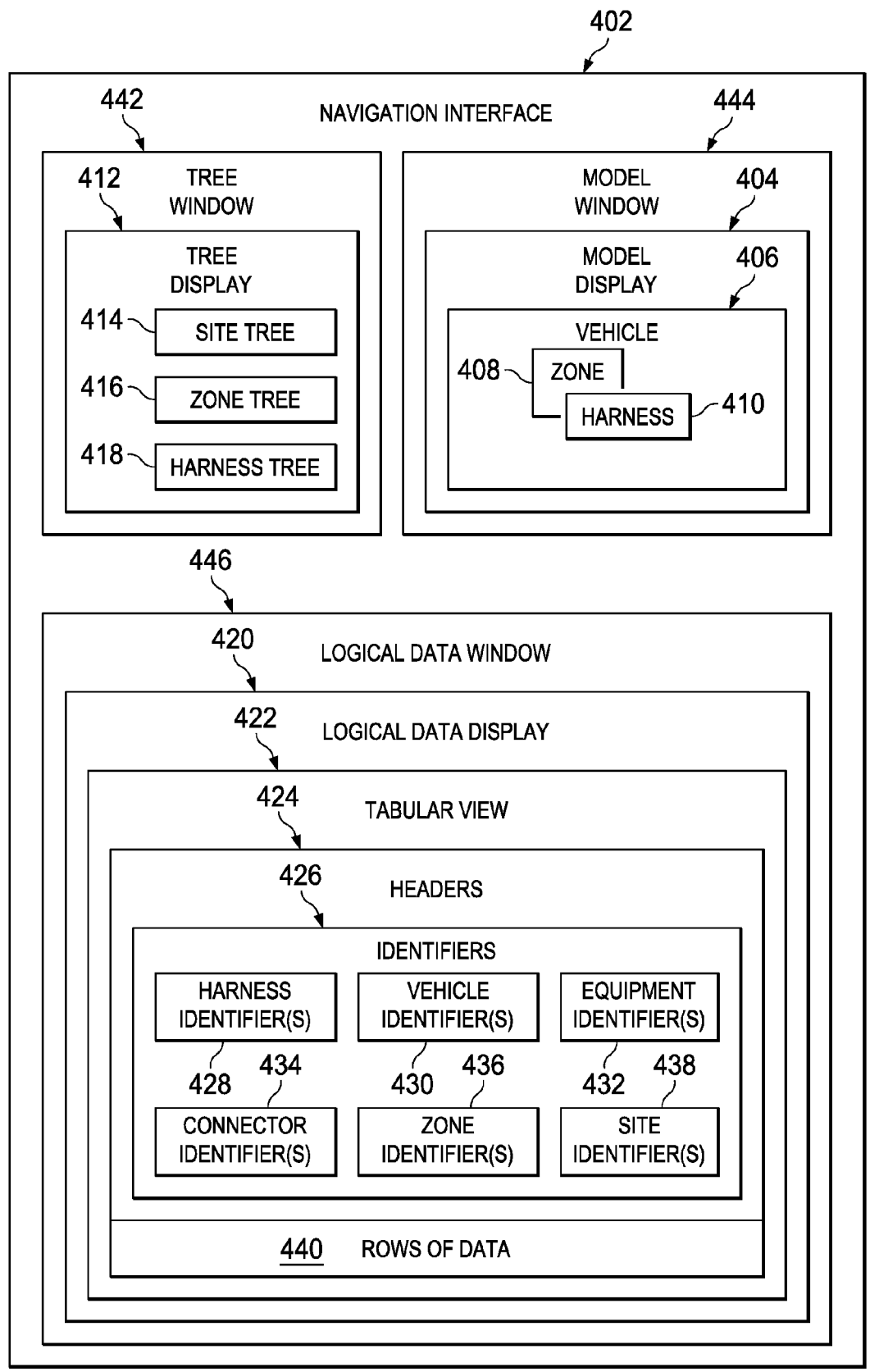
FIG. 4 is an illustration of a navigation interface in the form of a block diagram in accordance with an illustrative embodiment.
Figure 5:
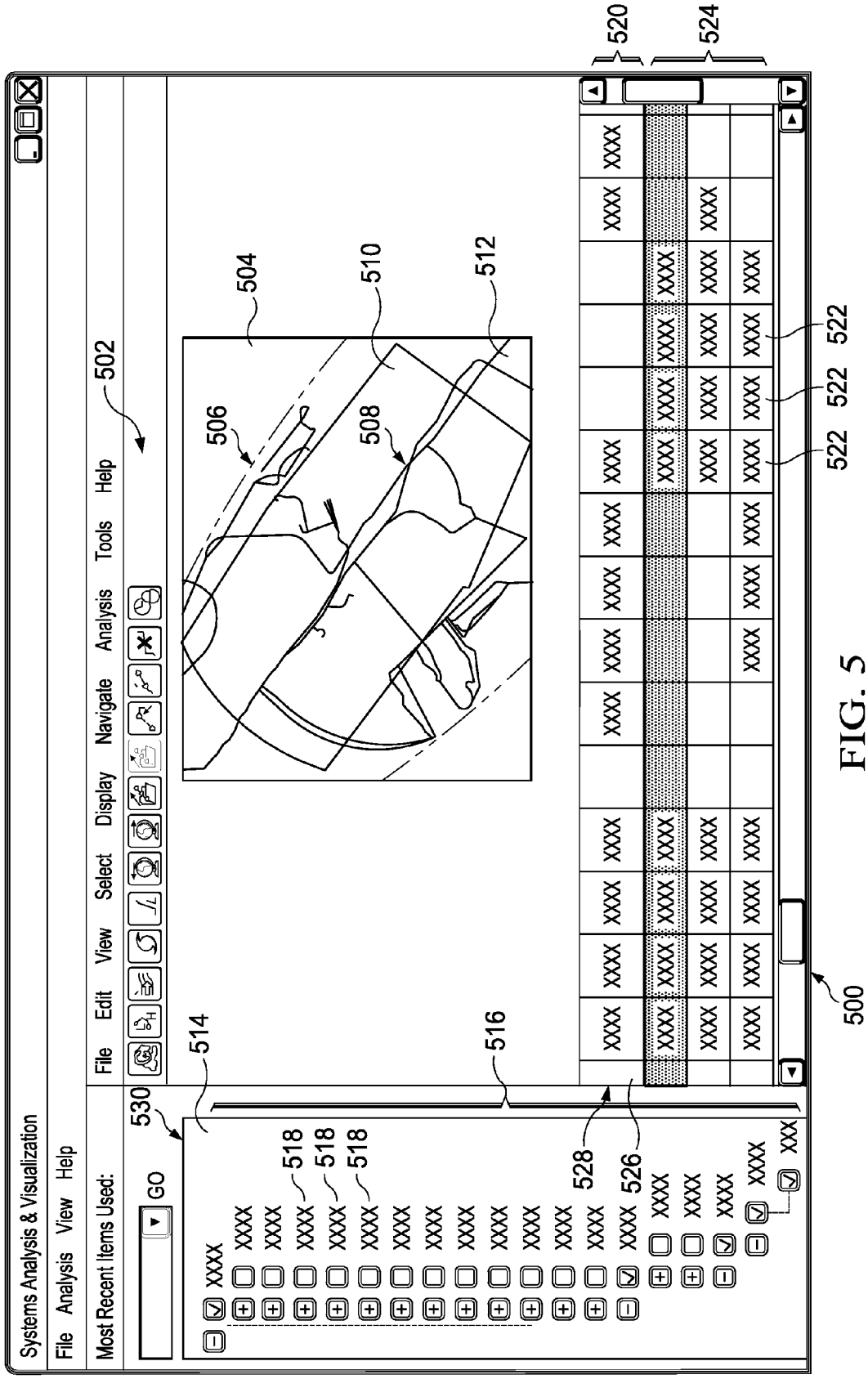
FIG. 5 is an illustration of a navigation interface in the form of a sample user interface in accordance with an illustrative embodiment.
Figure 6:
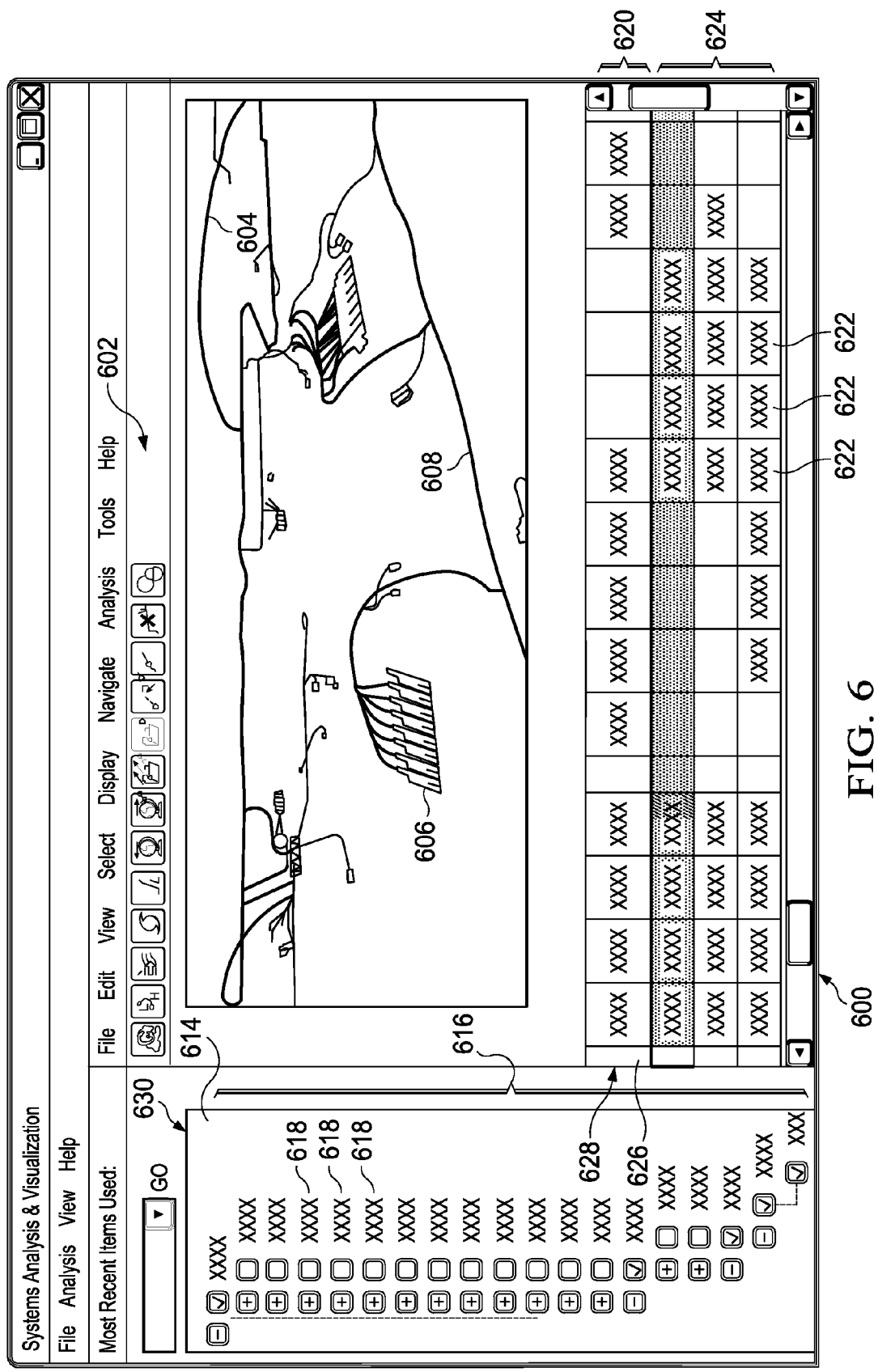
FIG. 6 is an illustration of another navigation interface in the form of a sample user interface in accordance with an illustrative embodiment.

Tree(s) 350 is an illustrative embodiment of tree 516 and tree 616 in FIGS. 5 and 6, respectively. Site tree 352 is an illustrative embodiment of site tree 414 in FIG. 4. Zone tree 358 is an illustrative embodiment of zone tree 416. Harness tree 364 is an illustrative embodiment of harness tree 418.

Navigation interface 378 is an illustrative embodiment of navigation interface 402, navigation interface 500, and navigation interface 600. Logical data window 380 is an illustrative embodiment of logical data window 446, logical data window 526, and logical data window 626. Logical data display 382 is an illustrative embodiment of logical data display 420, logical data display 528, and logical data display 628. Model window 384 is an illustrative embodiment of model window 444, model window 502, and model window 602. Model display 386 is an illustrative embodiment of model display 404, model display 504, and model display 604. Tree window 390 is an illustrative embodiment of tree window 442, tree window 530, and tree window 630 in FIGS. 4, 5, and 6, respectively.

FIG. 3 includes model 302, which is a three dimensional model of vehicle 334. Model 302 is displayed at a client, such as client 112, so that a user of the system can visualize how a harness 342 relates to vehicle 334 and then develop installation plan 348 for harness 342. Model 302 comprises modeling data 304.

Modeling data 304 is data that describes vehicle 334 and is used to provide a three dimensional view of model 302 of vehicle 334. Modeling data 304 comprises harness set 306, zone set 308, vehicle set 394, and transparency 370.

Harness set 306 is a set of modeling data 304 that is related to harness 342 that is identified by harness identifier 316. Harness set 306 of modeling data 304 can be used to overlay, highlight, or otherwise distinguish a view of harness 342 from a view of vehicle 334 when model 302 is displayed.

Zone set 308 is a set of modeling data 304 that is related to zone 336 that is identified by zone identifier 324. Zone set 308 of modeling data 304 can be used to overlay, highlight, or otherwise distinguish a view of zone 336 from a view of vehicle 334 when model 302 is displayed.

Vehicle set 394 is a set of modeling data 304 that is related to vehicle 334 that is identified by vehicle identifier 318. Viewing vehicle set 394 of modeling data 304 with harness set 306 and zone set 308 gives an understanding of how harness 342 described by harness set 306 of modeling data 304 and zone 336 described by zone set 308 of the modeling data 304 relates to vehicle 334. Vehicle set 394 may describe the outer surface of vehicle 334 or any other surface related to any structure or part of vehicle 334 that is modeled by model 302.

Transparency 370 is related to at least a portion of modeling data 304. Different portions of modeling data 304 can have different levels of transparency to show different aspects of model 302. For example, each of vehicle set 394, zone set 308, and harness set 306 may have a transparency level set such that a display of model 302 has vehicle 334 almost completely transparent, zone 336 mostly transparent, and harness 342 completely opaque. Doing so allows a user to see the vehicle, zone, and harness along with the geometric relationships between the vehicle, zone, and harness.

FIG. 3 also includes database 310. Database 310 stores and maintains logical data 312. Database 310 may be stored on and/or accessed via a server, such as server 104 in FIG. 1.

Logical data 312 is separate from modeling data 304 and describes non-geometric relationships. As an example, logical data 312 describes which sites 332 are for specified vehicles 334 that comprise specified zones 336, equipment 338, harnesses 342, and connectors 344. Logical data 312 of database 310 includes a group of identifiers 314.

The group of identifiers 314 comprises multiple types of identifiers. The group of identifiers 314 includes at least one of harness identifier 316, vehicle identifier 318, equipment identifier 320, connector identifier 322, zone identifier 324, site identifier 326, installation plan identifier 346, graphical identifier 376, and work identifier 396.

Harness identifier 316 identifies harness 342 and may include any of a model number, a serial number, and a revision number of harness 342. Harness identifier 316 may also be used to relate harness 342 to harness set 306 of modeling data 304.

Vehicle identifier 318 identifies vehicle 334 and may include any of a model number, a serial number, and a revision number of vehicle 334. Vehicle identifier 318 may also be used to relate vehicle 334 to vehicle set 394 of modeling data 304.

Equipment identifier 320 identifies equipment 338 and may include any of a model number, a serial number, and a revision number of equipment 338. Equipment identifier 320 may also be used to relate equipment 338 to modeling data 304.

Connector identifier 322 identifies connector 340 and may include any of a model number, a serial number, and a revision number of connector 340. Connector identifier 322 may also be used to relate connector 340 to modeling data 304.

Zone identifier 324 identifies zone 336 and may include any of a model number, a serial number, and a revision number related to zone 336. Zone identifier 324 may also be used to relate zone 336 to zone set 308 of modeling data 304.

Site identifier 326 identifies site 332 and may include any data used to describe site 332, including a city, state, or county where the site is located. Site identifier 326 may also be used to relate site 332 to modeling data 304.

Installation plan identifier 346 identifies installation plan 348 and may include any of a model number, a serial number, and a revision number of installation plan 348. Installation plan identifier 346 may also be used to relate installation plan 348 to modeling data 304.

Graphical identifier 376 may comprise any of identifiers 314 within logical data 312 of database 310. Displaying the graphical identifiers, which are related to logical data 312 in model display 386 of model window 384, is used to show a user how logical data 312 relates to modeling data 304.

Work identifier 396 identifies a type of work needed to be done in order to connect harness 342 to equipment 338 using connector 340. Work identifier 396 may include any descriptive text or numbers to identify the work to be done.

FIG. 3 also illustrates site 332, which is a location where construction, assembly, or manufacturing of at least a portion of vehicle 334 occurs. Sites may also be nested in that a site that is an assembly plant may include within it multiple subsites for assembling different portions of vehicle 334. Each site 332 is identified by site identifier 326. Site 332 comprises vehicle 334.

Vehicle 334 may be an aircraft with many harnesses, connectors, and equipment that need to be installed into vehicle 334. Each vehicle 334 is identified by vehicle identifier 318. Vehicle 334 comprises a group of zones 336.

Zone 336 is a portion of vehicle 334. Zones 336 within vehicle 334 subdivide portions of the vehicle into discrete areas that can be individually designed, assembled, or manufactured. Each zone 336 is identified by zone identifier 324. Zone 336 comprises equipment 338 and harness 342.

A piece of equipment in equipment 338 is any item installed into vehicle 334 and may be on a vehicle side of connector 340 or on a harness side of connector 340.

Each piece of equipment 338 is identified by equipment identifier 320. Equipment 338 comprises connector 340.

Connector 340 of equipment 338 is what allows harness 342 to be connected to equipment 338. Each connector 340 is identified by connector identifier 322.

Harness 342 is, for example, any pneumatic, optical, or electrical line connected between two or more points on vehicle 334 and can include a protective cover or ties that are associated with the lines. Each harness 342 is identified by harness identifier 316 and is also identifiable by a group of criteria 374. Harness 342 comprises connectors 344 and placement 372.

Connectors 344 of harness 342 are what allow harness 342 to be connected to equipment 338. Each connector 340 is identified by connector identifier 322.

Placement 372 of harness 342 is a place in vehicle 334 where the harness is located. Each placement 372 is related to a portion of harness set 306 of modeling data 304.

Installation plan 348 is a plan that provides information for and documents the installation of harness 342 to equipment 338 with connector 340 in zone 336 of vehicle 334 at site 332. Each installation plan is identified by installation plan identifier 346.

Group of trees 350 are elements of a graphical user interface portrayed as a hierarchical tree data structure. The hierarchy of the tree is indicative of relationships between identifiers displayed within tree 350. Trees 350 comprise site tree 352, zone tree 358, and harness tree 364. A tree 350 is a collection of nodes that each have a value and a list of child nodes with the lists of child nodes creating the hierarchy and indicating the relationships between the nodes.

Site tree 352 is used to display a portion of site identifiers 356 so that one of site identifiers 356 may be selected as selected identifier 328. Site tree 352 comprises relationships 354 and site identifiers 356. Site identifiers 356 are the values for the nodes of site tree 352.

Zone tree 358 is used to display a portion of zone identifiers 362 so that one of zone identifiers 362 may be selected as selected identifier 328. Zone tree 358 comprises relationships 360 and zone identifiers 362. Zone identifiers 362 are the values for the nodes of zone tree 358.

Harness tree 364 is used to display a portion of harness identifiers 368 so that one of harness identifiers 368 may be selected as selected identifier 328. Harness tree 364 comprises relationships 366 and harness identifiers 368. Harness identifiers 368 are the values for the nodes of harness tree 364.

Selected identifier 328 is one of identifiers 314 selected by a user. Selected identifier 328 may be used to identify a portion of logical data 312 to be sent between a client in a server and a portion of modeling data 304 that is to be sent between a client and a server.

FIG. 3 also illustrates navigation interface 378, which allows a user to interact with the logical data, the modeling data, and the trees. By interacting with navigation interface 378, the user can identify installation plan 348 that needs to be drafted for harness 342, equipment 338, zone 336, vehicle 334, or site 332, draft the identified installation plan, and update installation plan identifier 346. This visualization of the information can be done during system integration 1108 of FIG. 11 to plan the installation of harnesses. The visualization also can be used during maintenance and service of the vehicle to get information about harnesses for inspections, upgrades, or refurbishment of a vehicle, such as aircraft 1200 of FIG. 12. Navigation interface 378 comprises logical data window 380, model window 384, and tree window 390.

Logical data window 380 is a window of navigation interface 378 related to logical data 312. Logical data window 380 comprises logical data display 382.

Logical data display 382 is the display of logical data 312 on a client device. Logical data 312 may be displayed in a tabular view that allows the user to see and interact with logical data 312 in a tabular form, much like a spreadsheet.

Model window 384 is a window of navigation interface 378 related to model 302. Model window 384 comprises model display 386 and harness display 388.

Model display 386 is the display of model 302 on a client device and harness display 388 is a display of the portion of model 302 that is related to harness 342. Model 302 may be displayed in a three dimensional view that allows the user to see and interact with model 302 in three dimensions.

Tree window 390 is a window of navigation interface 378 related to trees 350. Tree window 390 comprises tree display 392.

Tree display 392 is the display of tree 350 on a client device. Tree 350 may be displayed such that clicking on a node of a tree opens up the list of child nodes for that node, which may then also be clicked upon.

Turning now to FIG. 4, an illustration of a navigation interface in the form of a block diagram is depicted in accordance with an illustrative embodiment. Navigation interface 402 is an illustrative embodiment of navigation interface 378, navigation interface 500, and navigation interface 600 in FIGS. 3, 5, and 6, respectively. Tree window 442 is an illustrative embodiment of tree window 390, tree window 530, and tree window 630. Tree display 412 is an illustrative embodiment of tree display 392, tree display 514, and tree display 614. Site tree 414 is an illustrative embodiment of site tree 352. Zone tree 416 is an illustrative embodiment of zone tree 358. Harness tree 418 is an illustrative embodiment of harness tree 364. Model window 444 is an illustrative embodiment of model window 384, model window 502, and model window 602. Model display 404 is an illustrative embodiment of model display 386, model display 504, and model display 604. Logical data window 446 is an illustrative embodiment of logical data window 380, logical data window 526, and logical data window 626. Logical data display 420 is an illustrative embodiment of logical data display 382, logical data display 528, and logical data display 628. Headers 424 are embodiments of headers 520 and headers 620. Identifiers 426 are embodiments of identifiers 522 and identifiers 622. Rows of data 440 are embodiments of rows of data 524 and rows of data 624.

Navigation interface 402 is a user interface that allows a user to interact with logical data and with modeling data to develop an installation plan for a harness of a vehicle. The logical data may be embodied as logical data 312 and logical data 122, the modeling data may be embodied as modeling data 304 and modeling data 118, the installation plan may be embodied as installation plan 348, the harness may be embodied as harness 342, and the vehicle may be embodied as vehicle 334 in FIG. 3. Navigation interface 402 comprises tree window 442, model window 444, and logical data window 446.

Tree window 442 is a window of navigation interface 402 that is a portion of navigation interface 402 for displaying a tree, such as tree 350 in FIG. 3. Tree window 442 comprises tree display 412.

Tree display 412 is the portion of tree window 442 for displaying a group of trees. Tree display 412 comprises site tree 414, zone tree 416, and harness tree 418.

Site tree 414 is an illustrative embodiment of site tree 352. Site tree 414 is used to display a group of the site identifiers, such as site identifiers 356, so that one of the site identifiers may be selected as a selected identifier, such as selected identifier 328 in FIG. 3.

Zone tree 416 is an illustrative embodiment of zone tree 358. Zone tree 416 is used to display a group of the zone identifiers, such as zone identifiers 362 in FIG. 3, so that one of the zone identifiers may be selected as a selected identifier.

Harness tree 418 is an illustrative embodiment of harness tree 364. Harness tree 418 is used to display a group of the harness identifiers, such as harness identifiers 368 in FIG. 3, so that one of the harness identifiers may be selected as a selected identifier.

Model window 444 is a window of navigation interface 402 that is a portion of navigation interface 402 for displaying a model, such as model 302 in FIG. 3. Model window 444 comprises model display 404.

Model display 404 is the portion of model window 444 for displaying a model. Model display 404 comprises views of vehicle 406, zone 408, and harness 410. Each of vehicle 406, zone 408, and harness 410 may have a different level of transparency, such as transparency 370 in FIG. 3, to allow the user to see the three dimensional relationships between vehicle 406, zone 408, and harness 410.

Logical data window 446 is a window of navigation interface 402 that is a portion of navigation interface 402 for displaying logical data, such as logical data 312 in FIG. 3. Logical data window 446 comprises logical data display 420.

Logical data display 420 is the portion of logical data window 446 for displaying logical data. Logical data display 420 comprises tabular view 422.

Tabular view 422 is a view of the logical data displayed as a group of rows, a group of columns, or a table, much like a spreadsheet. Tabular view 422 comprises headers 424 and rows of data 440.

Headers 424 are indications to a user of what type of data is within rows of data 440. Headers 424 comprise identifiers 426.

Identifiers 426 are a portion of identifiers 314 of logical data 312 in FIG. 3 that are displayed in navigation interface 402. Identifiers 426 may comprise any number of identifiers, including harness identifiers 428, vehicle identifiers 430, equipment identifiers 432, connector identifiers 434, zone identifiers 436, and site identifiers 438.

Rows of data 440 comprise data from logical data 312 that is described by identifiers 426 in headers 424. Data within rows of data 440 may be clicked upon and selected, so that the identifier related to that data becomes selected identifier 328 in FIG. 3.

Turning now to FIG. 5, an illustration of a navigation interface in the form of a sample user interface is depicted in accordance with an illustrative embodiment. Navigation interface 500 is an illustrative embodiment of navigation interface 378, navigation interface 402, and navigation interface 600 in FIGS. 3, 4, and 6, respectively. Tree window 530 is an illustrative embodiment of tree window 390, tree window 442, and tree window 630. Tree display 514 is an illustrative embodiment of tree display 392, tree display 412, and tree display 614. Model window 502 is an illustrative embodiment of model window 384, model window 444, and model window 602. Model display 504 is an illustrative embodiment of model display 386, model display 404, and model display 604. Logical data window 526 is an illustrative embodiment of logical data window 380, logical data window 446, and logical data window 626. Logical data display 528 is an illustrative embodiment of logical data display 382, logical data display 420, and logical data display 628. Headers 520 are embodiments of headers 424 and headers 620. Identifiers 522 are embodiments of identifiers 426 and identifiers 622. Rows of data 524 are embodiments of rows of data 440 and rows of data 624.

Navigation interface 500 is a user interface that allows a user to interact with logical data and modeling data to develop an installation plan for a harness of a vehicle. The logical data may be embodied as logical data 312 and 122, the modeling data may be embodied as modeling data 304 and modeling data 118, the installation plan may be embodied as installation plan 348, the harness may be embodied as harness 342, and the vehicle may be embodied as vehicle 334. Navigation interface 500 comprises model window 502, tree window 530, and logical data window 526.

Model window 502 is an illustrative embodiment of model window 384 and model window 444. Model window 502 comprises model display 504 that displays model 512 of a vehicle, zone 510 of the vehicle, harnesses 508 in the vehicle, and connectors 506 in the vehicle.

Tree window 530 is an illustrative embodiment of tree window 390 and tree window 442. Tree window 530 comprises a tree display 514 that displays tree 516 comprising a nested hierarchy of multiple identifiers 518.

Logical data window 526 is an illustrative embodiment of logical data window 380 and logical data window 446. Logical data window 526 comprises logical data display 528 that displays header 520 comprising multiple identifiers 522 and displays rows of data 524.

Turning now to FIG. 6, an illustration of a navigation interface in the form of a sample user interface is depicted in accordance with an illustrative embodiment. Navigation interface 600 is an illustrative embodiment of navigation interface 378, navigation interface 402, and navigation interface 500 in FIGS. 3, 4, and 5. Tree window 630 is an illustrative embodiment of tree window 390, tree window 442, and tree window 530. Tree display 614 is an illustrative embodiment of tree display 392, tree display 412, and tree display 514. Model window 602 is an illustrative embodiment of model window 384, model window 444, and model window 502. Model display 604 is an illustrative embodiment of model display 386, model display 404, and model display 504. Logical data window 626 is an illustrative embodiment of logical data window 380, logical data window 446, and logical data window 526. Logical data display 628 is an illustrative embodiment of logical data display 382, logical data display 420, and logical data display 528. Headers 620 are embodiments of headers 424 and headers 520. Identifiers 622 are embodiments of identifiers 426 and identifiers 522. Rows of data 624 are embodiments of rows of data 440 and rows of data 524.

Navigation interface 600 is a user interface that allows a user to interact with logical data and modeling data to develop an installation plan for a harness of a vehicle. The logical data may be embodied as logical data 312 and logical data 122, the modeling data may be embodied as modeling data 304 and modeling data 118, the installation plan may be embodied as installation plan 348, the harness may be embodied as harness 342, and the vehicle may be embodied as vehicle 334. Navigation interface 600 comprises model window 602, tree window 630, and logical data window 626.

Model window 602 is an illustrative embodiment of model window 384 and model window 444. Model window 602 comprises model display 604 that displays harnesses 608 and connectors 606.

Tree window 630 is an illustrative embodiment of tree window 390 and tree window 442. Tree window 630 comprises tree display 614 that displays tree 616 comprising a nested hierarchy of multiple identifiers 618.

Logical data window 626 is an illustrative embodiment of logical data window 380 and logical data window 446. Logical data window 626 comprises logical data display 628 that displays header 620 comprising multiple identifiers 622 and displays rows of data 624.

Figure 7:
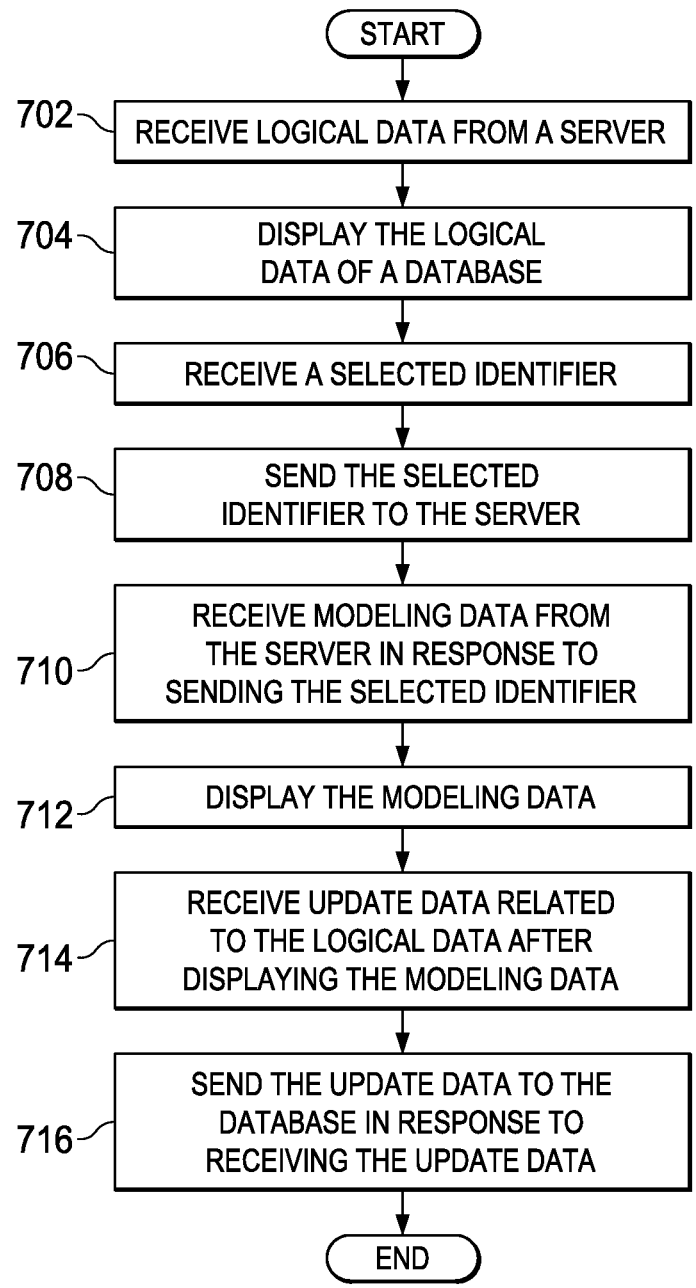
FIG. 7 is an illustration of a client method in the form of a flow chart in accordance with an illustrative embodiment.

Turning now to FIG. 7, an illustration of a client method in the form of a flow chart is depicted in accordance with an illustrative embodiment. In this illustrative example, described are the steps or operations that are performed by a client, such as client 112 in FIG. 1.

The client receives logical data of a database from a server in a message from the server (operation 702). The message from the server may be in response to a message that was previously sent from the client to the server that included a request for the logical data.

The client displays the logical data of a database on a display of the client (operation 704). The logical data may be displayed in a tabular view and may also be displayed in a tree view.

The client receives a selected identifier related to an identifier of a group of identifiers of the logical data of the database (operation 706). The selected identifier is received by the client through the use of input/output devices of the client. As an example, a client displays a list of possible selected identifiers, and a keyboard and mouse of the client are used to indicate which of the possible selected identifiers is to become the selected identifier.

The client optionally sends the selected identifier in a message to the server (operation 708). The selected identifier is related to a portion of the modeling data that is to be displayed based on the selected identifier being selected. For clients that do not already have the portion of the modeling data that is related to the selected identifier, the selected identifier may be sent to the server so that the server may identify the portion of the modeling data to be sent to the client. Alternatively, the client may identify the portion of the modeling data that is related to the selected identifier and request that portion of the modeling data directly in a message to the server.

The client optionally receives the modeling data from a message from the server in response to the sending of the selected identifier (operation 710). Alternatively, the modeling data received from the server may be in response to a request for a portion of the modeling data identified by the client as being related to the selected identifier.

The client displays the modeling data (operation 712). The modeling data may be received from the server, as discussed above, or may be stored at the client.

The client receives update data related to the logical data after displaying modeling data (operation 714). The update data is received via input/output devices connected to the client. Input/output devices include, for example, a mouse, a keyboard, a display, a touch screen, and the like. As an example, when the logical data is displayed in a tabular view, update data may be inserted into the tabular view, much like changing the value of a cell in a spreadsheet. The update data is an update to any of the data of the logical data of the database.

The client sends the update data to the database in response to receiving the update data (operation 716). The update data is used to update the data of the logical data of the database.

Figure 8:
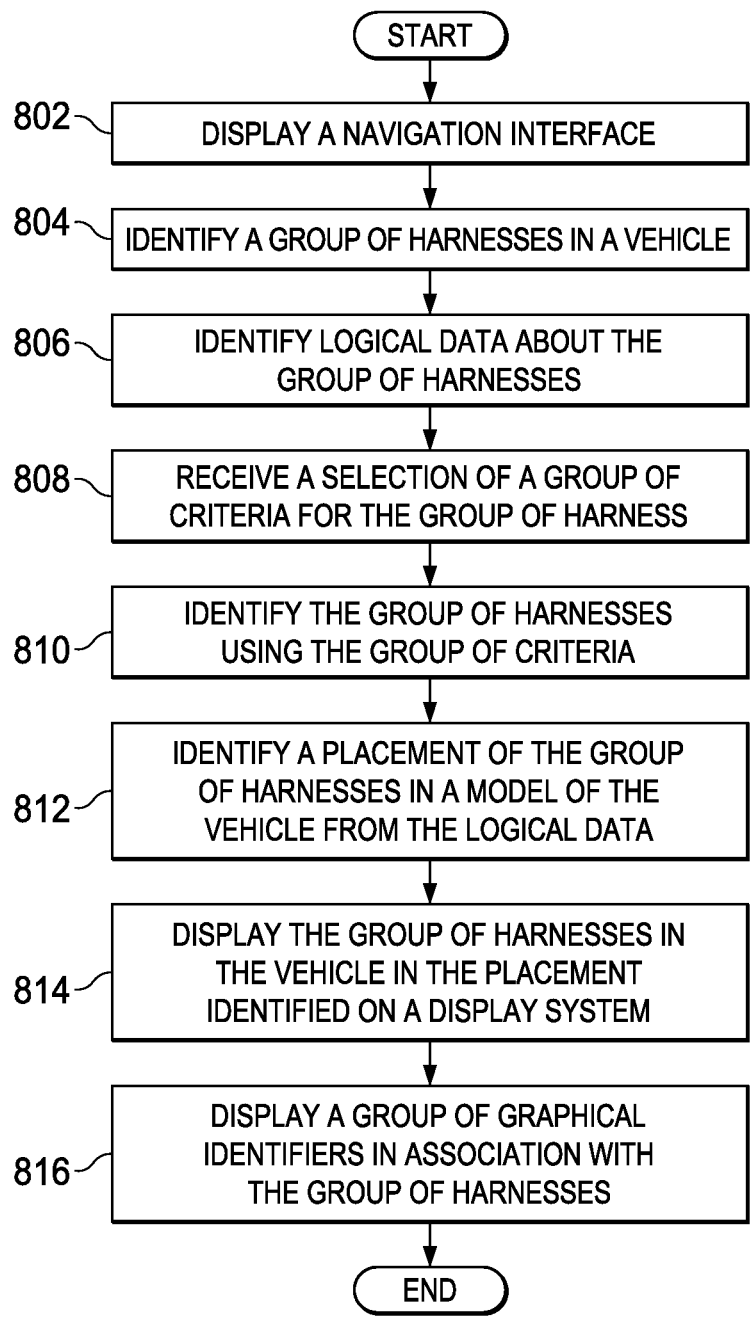
FIG. 8 is an illustration of another client method in the form of a flow chart in accordance with an illustrative embodiment.

Turning now to FIG. 8, an illustration of another client method in the form of a flow chart is depicted in accordance with an illustrative embodiment. In this illustrative example, described are the steps or operations that are performed by one or both of a client or a server, such as client 112 and server 104 of FIG. 1.

The client displays a navigation interface (operation 802). The navigation interface may be embodied as navigation interface 402, navigation interface 500, and navigation interface 600 of FIGS. 4, 5, and 6, respectively. The navigation interface is displayed on a display, such as display 114 of client 112. Displaying the navigation interface allows a user to operate the client so as to select an identifier of a group of identifiers, such as identifiers 314.

The client identifies a group of harnesses, such as harness 342, in a vehicle (operation 804). The identification can be performed by selecting an identifier from a tree in a tree display, such as tree display 412 and also by selecting data in a logical data display, such as logical data display 420. The user of the client identifies the group of harnesses to update the logical data, such as logical data 122, related to the harnesses of the group of harnesses. Alternative embodiments may have the identification of groups of harnesses performed by a server, such as server 104.

The client identifies logical data about the group of harnesses (operation 806). This identification may be achieved by highlighting a portion of logical data that is related to the group of harnesses. Alternatively, this identification may be made by the user selecting a portion of logical data. Additionally or alternatively, some or all of the identification may be performed by a server instead of or in addition to being performed by the client. The identification of logical data about the group of harnesses indicates the portion of logical data that is related to the group of harnesses.

The client receives a selection of a group of criteria for the group of harnesses (operation 808). The selection may be received via input/output devices that are connected to the client, via a predetermined configuration file, or via a message from the server. The criteria may be used as a filter to identify individual harnesses of the group of harnesses. Additionally or alternatively, some or all of the selection may be performed by a server instead of or in addition to being performed by the client.

The client identifies the group of harnesses using the group of criteria (operation 810). The group of harnesses is identified by comparing the criteria of the group of criteria to criteria related to the group of harnesses. Identifying a group of harnesses using the group criteria allows a user to select harnesses that have similar criteria. Additionally or alternatively, some or all of the identification may be performed by a server instead of or in addition to being performed by the client.

The client identifies a placement of the group of harnesses in a model of the vehicle from the logical data (operation 812). The placement of the group of harnesses relates to a location of where each harness is placed within a vehicle that is modeled by the model. The placement can be determined from one or more of a portion of the logical data of the database and the modeling data of the model. The identification of the placement can be performed by determining a portion of the modeling data that is related to the location of each harness within the model. Additionally or alternatively, some or all of the identification may be performed by a server instead of or in addition to being performed by the client.

The client displays the group of harnesses in the vehicle in the placement identified on a display system (operation 814). The client displays the group of harnesses by generating an image based on the modeling data that is related to the placement of the group of harnesses. Alternatively, the image based on the modeling data that is related to the placement of the group of harnesses may be generated by a server and sent to the client in a message from the server. Displaying the group of harnesses allows a user to see where the harnesses are located inside the vehicle of the model.

The client displays a group of graphical identifiers in association with the group of harnesses (operation 816). The graphical identifiers may comprise any of the identifiers within the logical data of the database. The graphical identifiers may appear in a layer above the model being displayed, or as a three dimensional part of the model being displayed. Displaying the graphical identifiers, which are related to the logical data, further shows a user how the logical data relates to the modeling data.

Figure 9:
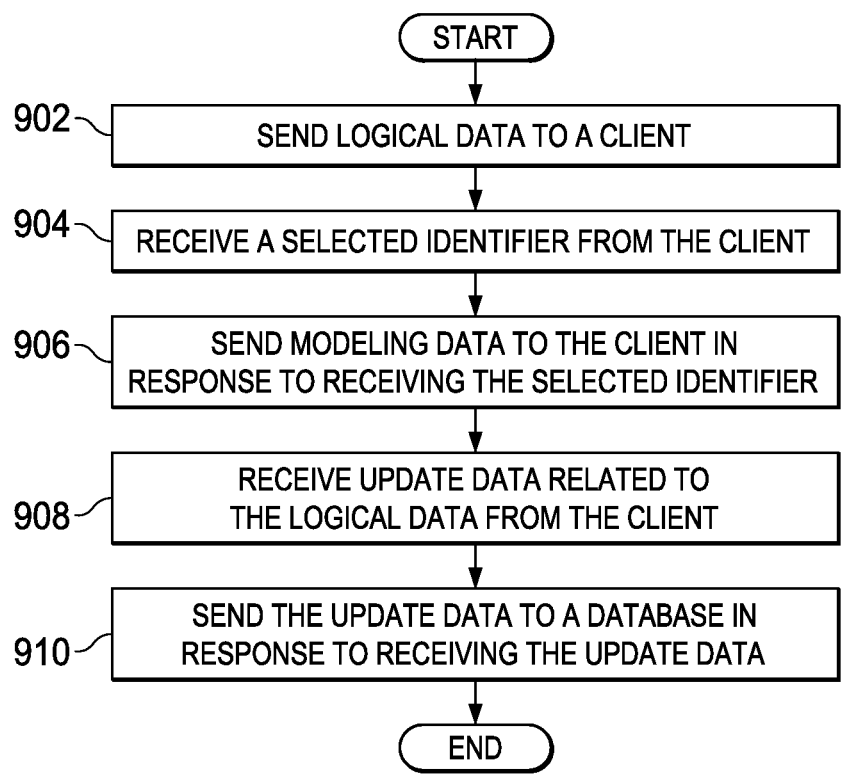
FIG. 9 is an illustration of a server method in the form of a flow chart in accordance with an illustrative embodiment.

Turning now to FIG. 9, an illustration of a server method in the form of a flow chart is depicted in accordance with an illustrative embodiment. In this illustrative example, described are the steps or operations that are performed by a server, such as the server 104 of the FIG. 1.

The server sends the logical data to a client (operation 902). The server sends the logical data via a network, such as network 108, via one or more messages. The amount of logical data sent may be a portion of the logical data of the database and this portion may be related to other portions of logical data that have already been sent to the client. The server sends the logical data to the client so that the client may display the logical data to the user.

The server optionally receives a selected identifier from the client (operation 904). The selected identifier may be received from the client in a message sent from the client and received by the server. The selected identifier may be received from the client when the client has not received some or all of the logical data related to the selected identifier and some or all of the modeling data related to the selected identifier.

The server optionally sends modeling data to the client in response to receiving the selected identifier (operation 906). The server sends one or more messages comprising some or all of the modeling data to the client. The modeling data that is sent may be related to a portion of the modeling data that has already been sent to the client and may also be related to the selected identifier, if the server has received the selected identifier. The server sends the modeling data to the client so that the client may display the modeling data to the user.

The server receives update data related to the logical data from the client (operation 908). The update data is received by the server in a message from the client. The update data was received by the client from the user via input/output devices of the client and the updated data indicates a change made by the user to the logical data.

The server sends the update data to a database in response to receiving the update data (operation 910). The update data is sent by the server in one or more messages to the database to update the logical data within the database.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operations 902, 904, 906, and 908, may happen multiple times and in any order, creating an interactive experience for the user.

For illustrative embodiments using a client and a server, messages are passed back and forth between the client and the server to communicate the selected identifier from the client to the server and to communicate the logical data and the modeling data to the client from the server. For embodiments using a workstation, most of or all of the logical data and the modeling data may be sent to the client upfront, which allows for a reduction of the amount of messaging between the client and server and for a faster displaying of the logical data and of the modeling data to the client since the client no longer needs to wait for a message from the server when a selected identifier is selected. The portion of the logical data being displayed and the portion of the modeling data being displayed are based on the selected identifier that is selected by the user.

Figure 10:
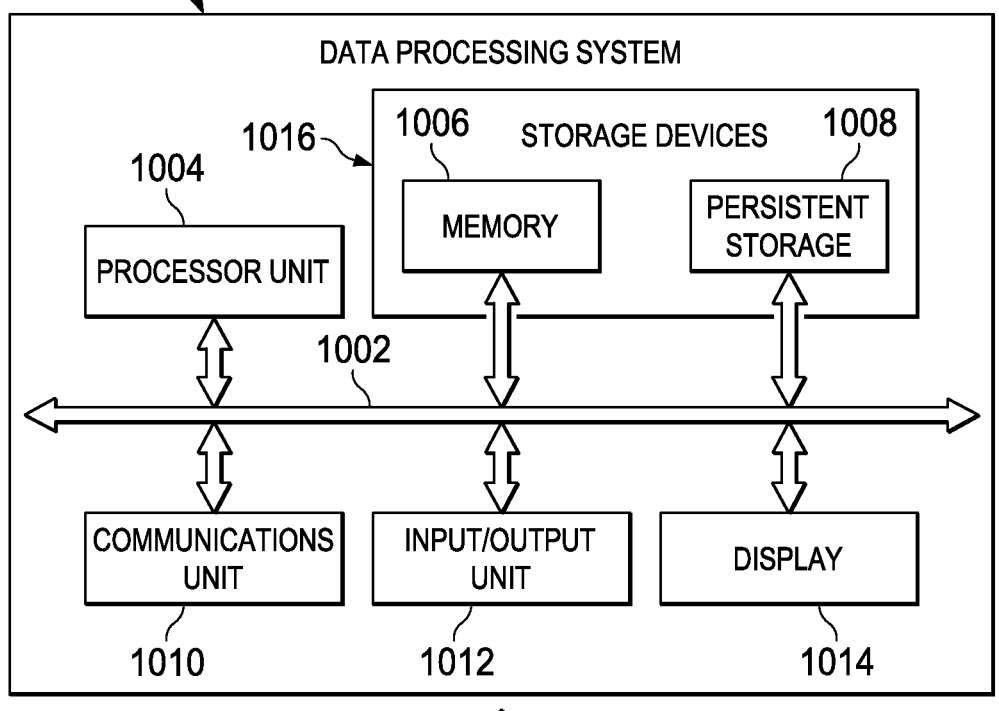
FIG. 10 is an illustration of a data processing system in the form of a block diagram in accordance with an illustrative embodiment.

Turning now to FIG. 10, an illustration of a data processing system is depicted in accordance with an illustrative embodiment. Data processing system 1000 may be used to implement server 104 and/or client 112. In this illustrative example, data processing system 1000 includes communications framework 1002, which provides communications between processor unit 1004, memory 1006, persistent storage 1008, communications unit 1010, input/output unit 1012, and display 1014. In these examples, communications frame work 1002 may be a bus system.

Processor unit 1004 serves to execute instructions for software that may be loaded into memory 1006. Processor unit 1004 may be a number of processors, a multi-processor core, or some other type of processor, depending on the particular implementation. A number, as used herein with reference to an item, means one or more items. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and/or other suitable information either on a temporary basis and/or a permanent basis. Storage devices 1016 may also be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications framework 1002. In these illustrative examples, the instructions are in a functional form on persistent storage 1008. These instructions may be loaded into memory 1006 for execution by processor unit 1004. The processes of the different embodiments may be performed by processor unit 1004 using computer implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000. In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1018 may be omitted because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications framework 1002 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 1006, or a cache, such as found in an interface and memory controller hub that may be present in communications framework 1002.

Illustrative embodiments of the disclosure may be described in the context of aircraft manufacturing and service method 1100 as shown in FIG. 11 and aircraft 1200 as shown in FIG. 12. Turning to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

Embodiments in accordance with the disclosure may be used during specification and design 1102 to develop an installation plan to begin planning when parts are to be later installed. Additional or alternative embodiments in accordance with the disclosure may be used during component and subassembly manufacturing 1106 to develop the installation plan after the completion of specification and design 1102.

Embodiments in accordance with the disclosure provide a user with access to logical data and modeling data via a single client without the use of paper schematics. In so doing, the complexity of drafting an installation is reduced, the time required to draft the installation plan is reduced, and the time for reviewing the installation plan is also reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying information about a group of harnesses, the method comprising:
    displaying, by a number of processors, logical data of a database, the logical data comprising a group of identifiers comprising a group of harness identifiers and a group of vehicle identifiers;
        wherein the logical data of the database is displayed in a logical data window of a navigation interface via a tabular view,
            the tabular view comprising a table displayed as a spreadsheet with a plurality of rows and a plurality of columns,
            the table comprising headers comprising identifiers from the group of identifiers, and
            the rows comprising data from the logical data;
    receiving a selected identifier of the group of identifiers; and
    displaying modeling data, the modeling data comprising a harness set related to a model of a vehicle that is associated with a vehicle identifier and is related to the selected identifier.

2. The method of claim 1, wherein:
    the group of identifiers further comprises a group of equipment identifiers, a group of connector identifiers, a group of zone identifiers, a group of vehicle identifiers, and a group of site identifiers.

3. The method of claim 1, further comprising:
    receiving the logical data from a server;
    sending the selected identifier to the server; and
    receiving the modeling data from the server in response to sending the selected identifier.

4. The method of claim 1, wherein:
    the modeling data further comprises a zone set of the modeling data related to a group of zones of the vehicle, each zone related to a zone identifier of the group of identifiers.

5. The method of claim 1, further comprising:
    receiving update data related to the logical data after the displaying of the modeling data; and
    sending the update data to the database in response to receiving the update data.

6. The method of claim 5, wherein:
    the update data relates to an installation plan that documents the installation of a harness to an equipment with a connector in a zone of a vehicle at a site, and wherein:
        the harness is identified by a harness identifier of the group of identifiers;
        the equipment is identified by an equipment identifier of the group of identifiers;
        the connector is identified by a connector identifier of the group of identifiers;
        the zone is identified by a zone identifier of the group of identifiers;
        the vehicle is identified by a vehicle identifier of the group of identifiers;
        the site is identified by a site identifier of the group of identifiers; and
        the selected identifier is one of the harness identifier, the equipment identifier, the connector identifier, the zone identifier, the vehicle identifier, and the site identifier.

7. The method of claim 1, wherein displaying logical data further comprises:
    displaying the logical data as a hierarchical tree indicative of relationships between one of the group of identifiers displayed on the hierarchical tree, and wherein:
        the selected identifier is selected from the hierarchical tree;
        the hierarchical tree is one of a group of hierarchical trees, each hierarchical tree displaying a combination of the group of identifiers; and
        the group of hierarchical trees comprises a site tree comprising a group of site identifiers, a zone tree comprising a group of zone identifiers, and a harness tree comprising the group of harness identifiers.

8. The method of claim 7,
    wherein the logical data of the database displayed as the hierarchical tree is displayed in a tree window of the navigation interface; and
    wherein the modeling data is three dimensional and is displayed in a model window of the navigation interface.

9. The method of claim 1, wherein:
    the harness identifier and the vehicle identifier each comprise a model number, a serial number, and a revision number;
    the modeling data further comprises a zone set of the modeling data related to a group of zones of the vehicle, each zone related to a zone identifier of the group of identifiers; and
    displaying logical data further comprises:
        displaying the logical data as a hierarchical tree indicative of relationships between one of the group of identifiers displayed on the hierarchical tree, and wherein:
            the selected identifier is selected from the hierarchical tree;
            the hierarchical tree is one of a group of hierarchical trees, each hierarchical tree displaying a combination of the group of identifiers;
            the group of hierarchical trees comprises a site tree comprising a group of site identifiers, a zone tree comprising a group of zone identifiers, and a harness tree comprising the group of harness identifiers;
            the logical data of the database displayed as the hierarchical tree is displayed in a tree window of the navigation interface; and
            the modeling data is three dimensional and is displayed in a model window of the navigation interface.

10. An apparatus that displays modeling data, the apparatus comprising:
    a display configured to display logical data of a database, the logical data comprising a group of identifiers comprising a group of harness identifiers and a group of vehicle identifiers;
        wherein the logical data of the database is displayed in a logical data window of a navigation interface via a tabular view,
            the tabular view comprising a table displayed as a spreadsheet with a plurality of rows and a plurality of columns, the table comprising headers comprising identifiers from the group of identifiers, and the rows comprising data from the logical data; and a processor configured to receive a selected identifier from the group of identifiers, wherein:

the display is further configured to display modeling data, the modeling data comprising a harness set related to a model of a vehicle that is associated with a vehicle identifier and is related to the selected identifier.

11. The apparatus of claim 10, wherein:

the processor is further configured to receive the logical data from a server;

the processor is further configured to send the selected identifier to the server; and the processor is further configured to receive the modeling data from the server in response to sending the selected identifier.

12. The apparatus of claim 10, wherein:

the modeling data further comprises a zone set of the modeling data related to a group of zones of the vehicle, each zone related to a zone identifier of the group of identifiers.

13. The apparatus of claim 10, wherein:

the processor is further configured to receive update data related to the logical data after displaying the modeling data; and the processor is further configured to send the update data to the database in response to receiving the update data.

14. The apparatus of claim 12, wherein:

the update data relates to an installation plan that documents the installation of a harness to an equipment with a connector in a zone of the vehicle at a site, and wherein:

the harness is identified by a harness identifier of the group of identifiers;

the equipment is identified by an equipment identifier of the group of identifiers;

the connector is identified by a connector identifier of the group of identifiers;

the zone is identified by a zone identifier of the group of identifiers;

the vehicle is identified by a vehicle identifier of the group of identifiers;

the site is identified by a site identifier of the group of identifiers; and the selected identifier is one of the harness identifier, the equipment identifier, the connector identifier, the zone identifier, the vehicle identifier, and the site identifier.

15. The apparatus of claim 10, wherein:

the display is further configured to display the logical data as a hierarchical tree indicative of relationships between one of the group of identifiers displayed on the hierarchical tree, and wherein:

the selected identifier is selected from the hierarchical tree;

the hierarchical tree is one of a plurality of hierarchical trees, wherein each hierarchical tree displays a combination of the group of identifiers; and the plurality of the hierarchical trees comprises a site tree comprising a plurality of site identifiers, a zone tree comprising a plurality of zone identifiers, and a harness tree comprising a plurality of harness identifiers.

16. A method for displaying information about a harness in a vehicle, the method comprising:

identifying, by a number of processors, a group of harnesses in the vehicle;

identifying logical data about the group of harnesses in the vehicle;

identifying a placement of the group of harnesses in a model of the vehicle from the logical data; and displaying the group of harnesses in the vehicle in the placement identified on a display system;

wherein the logical data is displayed in a logical data window of a navigation interface via a tabular view, the tabular view comprising a table displayed as a spreadsheet with a plurality of rows and a plurality of columns, the table comprising headers comprising identifiers from the group of identifiers, and the rows comprising data from the logical data.

17. The method of claim 16, wherein identifying the group of harnesses in the vehicle comprises:

receiving a selection of a group of criteria for the group of harnesses; and identifying the group of harnesses using the group of criteria.

18. The method of claim 17, wherein the group of criteria is selected from a group of identifiers comprising a group of harness identifiers, a group of equipment identifiers, a group of connector identifiers, a group of zone identifiers, a group of vehicle identifiers, and a group of site identifiers.

19. The method of claim 16, wherein the logical data comprises data in a tabular form and wherein the data describes a group of equipment for the group of harnesses and locations of equipment in the vehicle.

20. The method of claim 16 further comprising:

displaying the navigation interface that includes the logical data window and a model window, wherein the group of harnesses in the vehicle in the placement identified is displayed in the logical data window and the model of the vehicle is displayed in the model window.

21. The method of claim 16, wherein displaying the group of harnesses in the vehicle in the placement identified on the display system comprises:

displaying a group of graphical identifiers in association with the group of harnesses.

* * * * *